US008572729B1

(12) United States Patent
Lowe et al.

(10) Patent No.: US 8,572,729 B1
(45) Date of Patent: Oct. 29, 2013

(54) SYSTEM, METHOD AND COMPUTER PROGRAM PRODUCT FOR INTERCEPTION OF USER MODE CODE EXECUTION AND REDIRECTION TO KERNEL MODE

(75) Inventors: Joe C. Lowe, Aloha, OR (US); Jonathan L. Edwards, Portland, OR (US); Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 1663 days.

(21) Appl. No.: 11/344,431

(22) Filed: Jan. 30, 2006

(51) Int. Cl.
*G06F 11/30* (2006.01)
*H04L 9/00* (2006.01)

(52) U.S. Cl.
USPC ............... 726/22; 726/25; 710/266; 710/269; 710/260; 714/25; 713/165; 713/167

(58) Field of Classification Search
USPC ......................................................... 726/22
See application file for complete search history.

(56) References Cited

U.S. PATENT DOCUMENTS

| 5,062,040 | A | * | 10/1991 | Bishop et al. ................. 719/318 |
| 5,313,616 | A | * | 5/1994 | Cline et al. .................... 717/127 |
| 5,369,770 | A | * | 11/1994 | Thomason et al. ........... 710/260 |
| 5,867,710 | A | * | 2/1999 | Dorris et al. .................. 717/124 |
| 6,275,938 | B1 | * | 8/2001 | Bond et al. ....................... 726/23 |
| 6,301,699 | B1 | | 10/2001 | Hollander et al. ................ 717/4 |
| 6,412,071 | B1 | | 6/2002 | Hollander et al. ............ 713/200 |
| 6,823,460 | B1 | | 11/2004 | Hollander et al. ............ 713/200 |
| 7,085,928 | B1 | * | 8/2006 | Schmid et al. ................ 713/164 |
| 7,165,135 | B1 | * | 1/2007 | Christie et al. ................ 710/269 |
| 7,213,247 | B1 | * | 5/2007 | Wilner et al. ................. 718/100 |
| 7,287,283 | B1 | * | 10/2007 | Szor ................................. 726/26 |
| 7,334,163 | B1 | * | 2/2008 | Sallam ............................ 714/38 |
| 7,398,389 | B2 | * | 7/2008 | Teal et al. ...................... 713/164 |
| 7,437,766 | B2 | * | 10/2008 | Cohen et al. ..................... 726/26 |
| 7,451,456 | B2 | * | 11/2008 | Andjelic ........................ 719/321 |
| 7,484,239 | B1 | * | 1/2009 | Tester et al. ....................... 726/2 |
| 7,562,359 | B1 | * | 7/2009 | Andersen ...................... 717/175 |
| 7,587,724 | B2 | * | 9/2009 | Yeap ............................. 719/328 |
| 7,603,704 | B2 | * | 10/2009 | Bruening et al. ............... 726/22 |
| 7,685,638 | B1 | * | 3/2010 | Buches .......................... 726/22 |
| 7,694,328 | B2 | * | 4/2010 | Joshi et al. ........................ 726/2 |
| 7,698,731 | B2 | * | 4/2010 | Johnson et al. .................. 726/1 |
| 7,707,558 | B2 | * | 4/2010 | Yeap et al. .................... 717/130 |
| 7,841,006 | B2 | * | 11/2010 | Gassoway ....................... 726/23 |
| 7,908,640 | B2 | * | 3/2011 | Beresnevichiene et al. ...... 726/1 |
| 8,239,673 | B2 | * | 8/2012 | Shankar et al. ............... 713/164 |
| 2003/0014521 | A1 | * | 1/2003 | Elson et al. ................... 709/225 |
| 2003/0226022 | A1 | * | 12/2003 | Schmidt et al. ............... 713/189 |
| 2004/0123103 | A1 | * | 6/2004 | Risan et al. ................... 713/164 |

(Continued)

OTHER PUBLICATIONS

Jack, B., 'Remote Windows Kernel Exploitation Step into the Ring 0', 2005, eEye Digital Security, White Paper-entire document, http://www.eeye.com/eEyeDigitalSecurity/media/ResearchPapers/StepIntoTheRing.pdf?ext=.pdf.*

(Continued)

*Primary Examiner* — Edan Orgad
*Assistant Examiner* — Ronald Baum
(74) *Attorney, Agent, or Firm* — Wong, Cabello, Lutsch, Rutherford & Brucculeri, LLP

(57) ABSTRACT

A system, method and computer program product are provided. In use, code is executed in user mode. Further, the execution of the code is intercepted. In response to the interception, operations are performed in kernel mode.

20 Claims, 5 Drawing Sheets

(56) References Cited

U.S. PATENT DOCUMENTS

| | | | |
|---|---|---|---|
| 2005/0076237 A1* | 4/2005 | Cohen et al. | 713/201 |
| 2005/0120242 A1* | 6/2005 | Mayer et al. | 713/201 |
| 2006/0130016 A1* | 6/2006 | Wagner | 717/136 |
| 2008/0016339 A1* | 1/2008 | Shukla | 713/164 |

OTHER PUBLICATIONS

T. Maeda et al., "Safe Execution of User Programs in Kernel Mode using Typed Assembly Language" University of Tokyo, http://web.yl.is.s.u-tokyo.ac.jp/~tosh/kml.

* cited by examiner

SYSTEM, METHOD AND COMPUTER PROGRAM PRODUCT FOR INTERCEPTION OF USER MODE CODE EXECUTION AND REDIRECTION TO KERNEL MODE

FIELD OF THE INVENTION

The present invention relates to operating systems, and more particularly to code redirection during operating system operation.

BACKGROUND

Modern day operating systems have a history of security weaknesses that allow malicious code and users to attack a computer system using numerous available techniques. For example, one type of attack works by tricking an authorized user into executing malicious code on a computer system. Various techniques have been developed for preventing these attacks. For example, one technique modifies, or hooks, the behavior of the computer system in a way that specifically prevents these attacks from working.

Hooking applications are becoming increasingly popular, especially in the security and network management arts. Such hooking applications are adapted for hooking various aspects of an interface. By way of example, some of such applications are capable of hooking application program interface (API) calls.

Such API hooking is a technique where an API is modified so that subsequent invocations of a particular function transfers control to a handler. This handler may then, in turn, analyze the original API invocation, report usage of the API, modify relevant parameters, etc. Further, in the case of security applications, API hooking may serve to enable a decision as to allowing or disallowing the original API to be invoked.

Unfortunately, however, present hooking applications do not deal efficiently with attacks that involve user mode code execution. There is thus a need for overcoming these and/or other problems associated with the prior art.

SUMMARY

A system, method and computer program product are provided. In use, code is executed in user mode. Further, the execution of the code is intercepted. In response to the interception, operations are performed in kernel mode.

DETAILED DESCRIPTION

Figure 1:
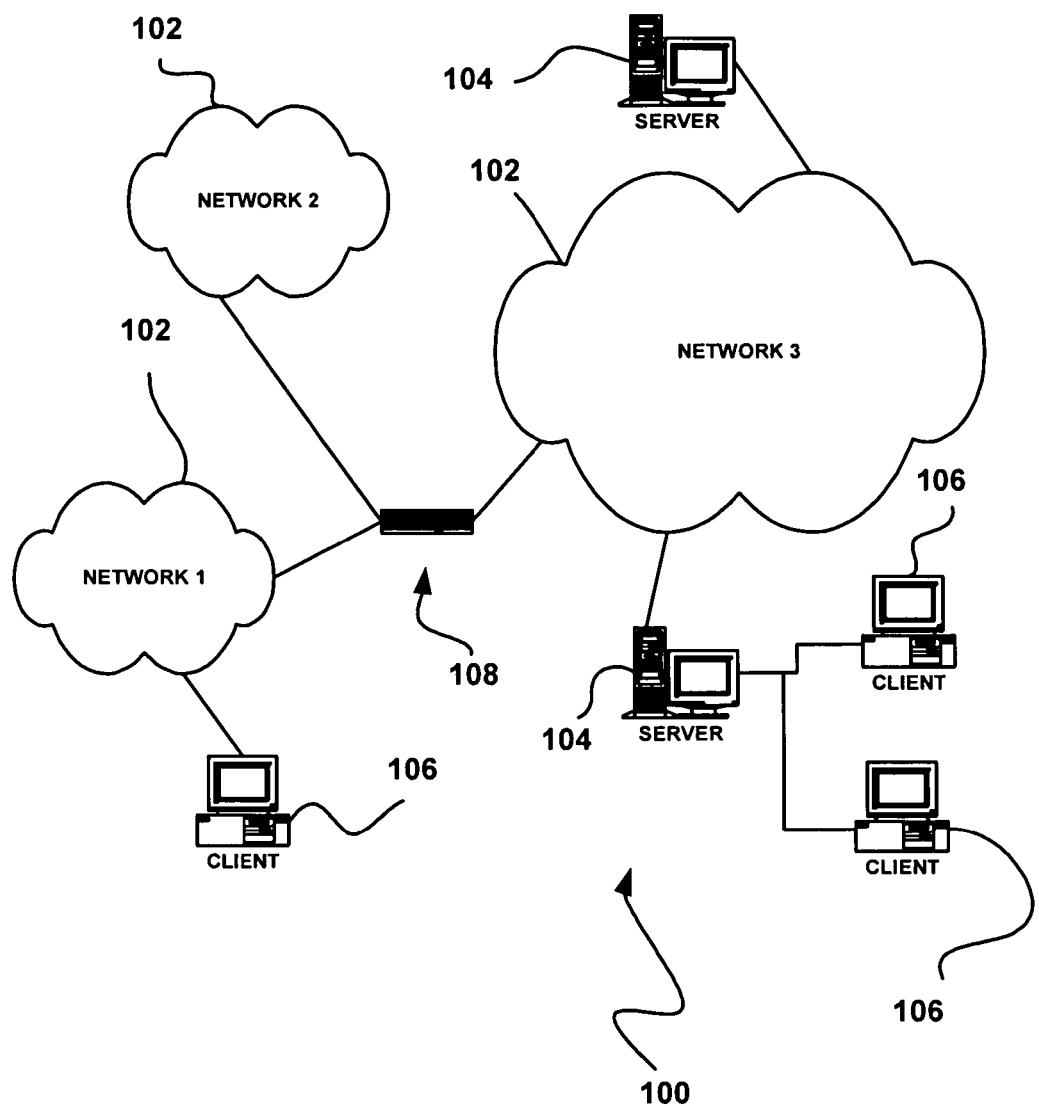
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

Figure 2:
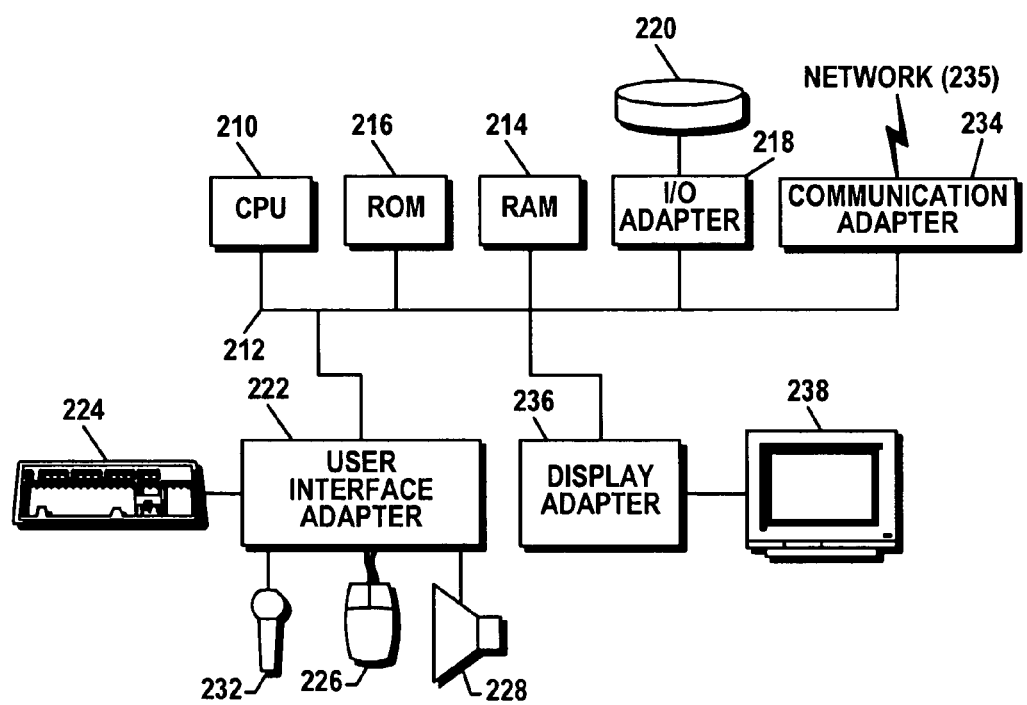
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
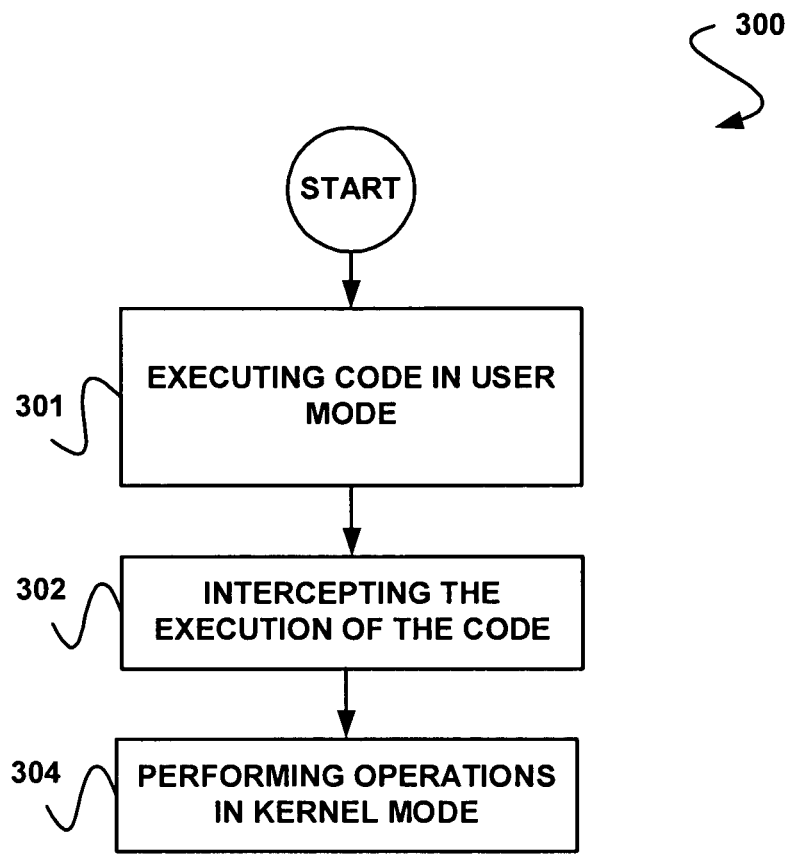
FIG. 3 shows a method for redirecting code executing in user mode, in accordance with one embodiment.

FIG. 3 shows a method 300 for redirecting code executing in user mode, in accordance with one embodiment. As an option, the method 300 may be implemented in the context of the architecture and environment of FIGS. 1 and/or 2. Of course, however, the method 300 may be carried out in any desired environment.

As shown, code is executed in user mode, per operation 301. In the context of the present description, such user mode refers to a processing access mode in which applications and/or subsystems run on a computer (e.g. see, for example, the computers 104, 106 of FIG. 1, etc.). Code that is executed in such user mode executes within an associated virtual address spaces. Further, such user mode code is restricted from gaining direct access to some components of the computer that may compromise system integrity (e.g. system hardware, memory not allocated for user mode, etc.). Code that is executed in user mode is effectively isolated from kernel mode code execution which will be defined later. One exemplary user mode is the MICROSOFT® WINDOWS® operating system user mode.

Next in operation 302, the execution of the code is intercepted. In the context of the present description, the term interception may refer to any control that allows transfer of the execution to a kernel mode, in a manner that will soon be set forth. In one illustrative embodiment, the interception may be optionally carried out utilizing a redirect stub. More information regarding such optional embodiment will be set forth in greater detail during reference to FIGS. 4-5.

In response to the interception, operations are performed in kernel mode. Note operation 304. In the context of the present description, such kernel mode refers to a processor access mode in which operating system components and/or drivers run. Code executed in kernel mode may directly access computer components (e.g. system data, system hardware, etc.) inaccessible to code executed in use mode. Kernel mode components are protected from code executed in the aforementioned user mode. One exemplary kernel mode is the MICROSOFT® WINDOWS® operating system kernel mode.

Further in the context of the present description, the aforementioned operations may include diagnostic operations, maintenance operations, security operations (e.g. for precluding malware from executing, etc.), and/or any other operations capable of being performed in the kernel mode. In the context of the embodiment where the operations include security operations, the method 300 may optionally be used to allow a system extension to run in kernel mode in the form of a software device driver (or any other form, for that matter, etc.) that can intercept the execution of specific code in user mode and perform additional and/or replacement operations from kernel mode code. Such additional and/or replacement operations in kernel mode may then, in turn, be used to prevent known and/or unknown computer attacks from succeeding.

More illustrative information will now be set forth regarding various optional architectures and features with which the foregoing technique may or may not be implemented, per the desires of the user. Specifically, more information will be set forth regarding one exemplary way code may be modified so that it may be intercepted when executed in user mode (see FIG. 4). Further, more information will be set forth regarding one exemplary way code may be intercepted in user mode (see FIG. 5).

It should be strongly noted that the following information is set forth for illustrative purposes and should not be construed as limiting in any manner. Any of the following features may be optionally incorporated with or without the exclusion of other features described in and out of a security-related context.

Figure 4:
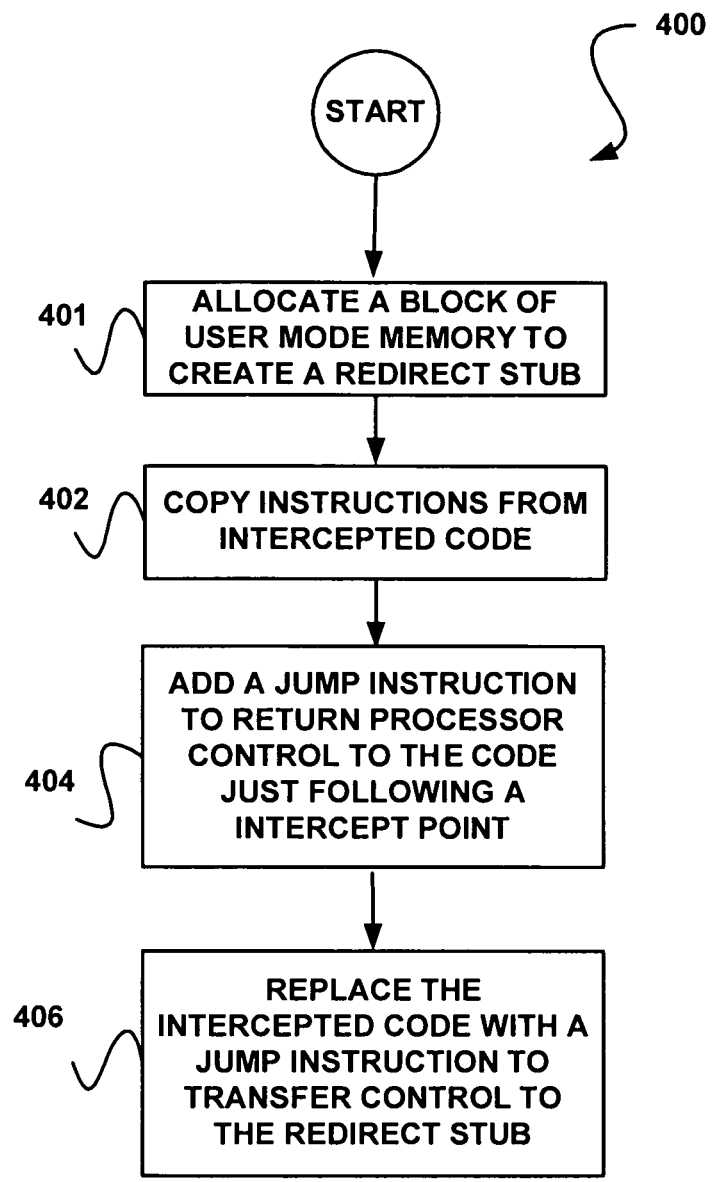
FIG. 4 shows a method for modifying code so that it may be intercepted when executed in user mode, in accordance with another embodiment.

FIG. 4 shows a method 400 for modifying code so that it may be intercepted when executed in user mode, in accordance with another embodiment. As an option, the present method 400 may be implemented in the context of the architecture and environment of FIGS. 1-3. Of course, however, the method 400 may be carried out in any desired environment. Further, the aforementioned definitions may equally apply to the description below.

In operation 401, a block of user mode memory is allocated to create a redirect stub. In the context of the present description, a stub may refer to any routine that substitutes for another routine. Further, a redirect stub may refer to any stub that is capable of being utilized in the code interception of operation 302 of FIG. 3. Further, the user mode memory may include any memory where code is stored for executing in user mode.

Thus, for each user mode code location that is to be intercepted, a kernel mode driver may allocate a block of user mode memory to create the redirect stub. The redirect stub may begin with a series of computer instructions that implement a trap into kernel mode.

Next, following the aforementioned trap, instructions from the code to be intercepted are copied. See operation 402. In one embodiment, such copying may be beneficial to ensure that there is sufficient space for a jump instruction to be added, in a manner that will soon be set forth. In other words, such copy frees up memory, which may not otherwise be available, so that the foregoing jump instruction may be inserted.

A jump instruction is then added after the copied instructions, as indicated in operation 404. The purpose of such jump instruction is to return the execution of the code to a location following a point of interception, after the desired operations have been performed in kernel mode.

Finally, the code to be intercepted is replaced with another jump instruction to transfer control to the redirect stub during use. See operation 406. Thus, such jump instruction is used to actually transfer control to the redirect stub, when the user mode code has been intercepted, in a manner that will soon be set forth.

Once this is completed, anytime the intercepted code is executed, control transfers to the redirect stub, traps into kernel mode, returns from kernel mode to the relocated intercepted instructions, and finally returns to the code just following the intercept point. More information regarding such interception, and follow on operations, will be set forth in greater detail now during reference to FIG. 5.

Figure 5:
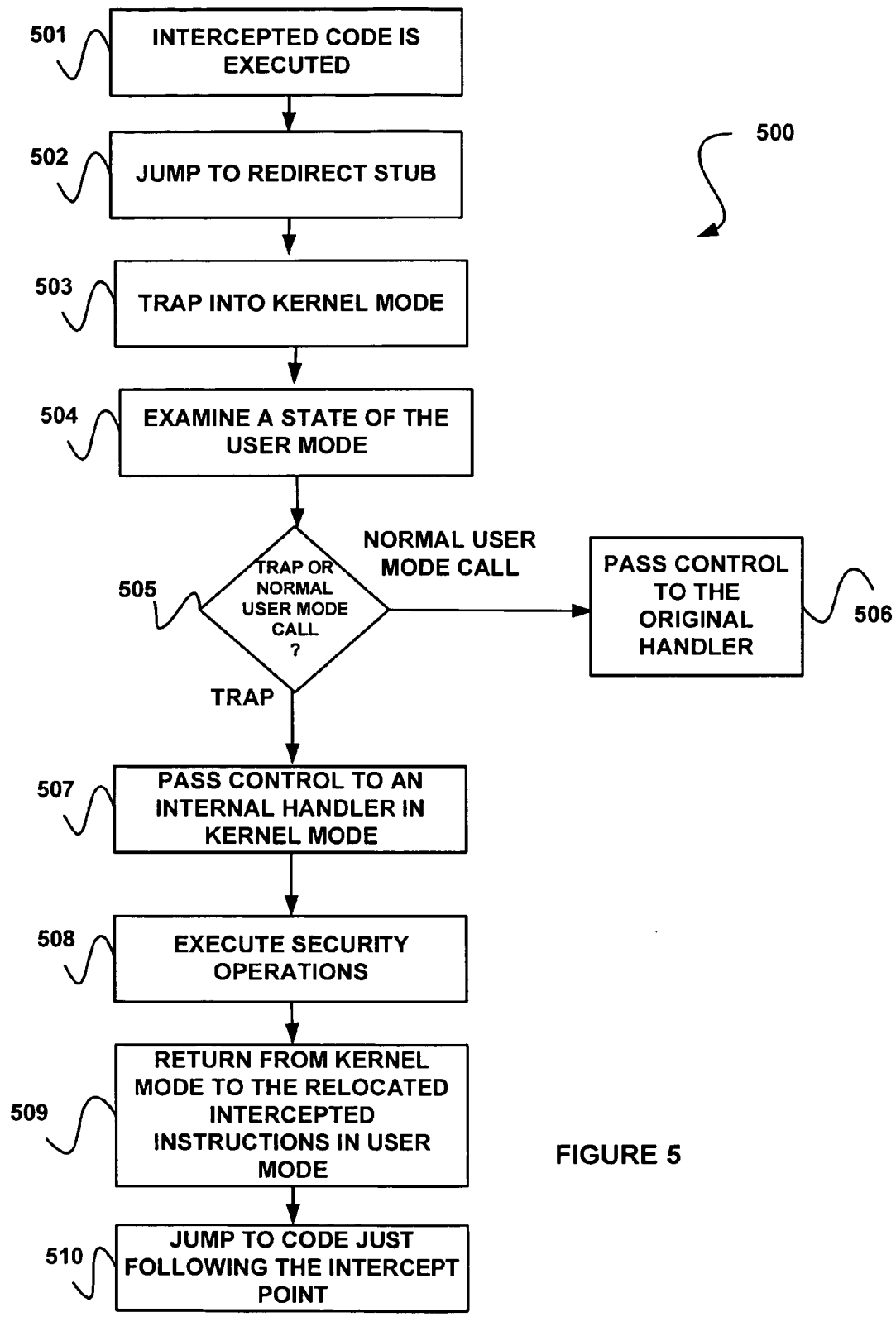
FIG. 5 shows a method for intercepting code when executed in user mode, in accordance with another embodiment.

FIG. 5 shows a method 500 for intercepting code when executed in user mode, in accordance with another embodiment. As an option, the present method 500 may be implemented in the context of the architecture and environment of FIGS. 1-4. Of course, however, the method 500 may be carried out in any desired environment. Further, the aforementioned definitions may equally apply to the description below.

As shown, it is first determined, in operation 501, whether intercepted code is executed. If it is determined that the intercepted code is executed, the method 500 jumps to the redirect stub. See operation 502. This may be accomplished, for example, using the jump instruction set forth in operation 406 of FIG. 4 to redirect a call to the redirect stub, etc. In response to the jump, the execution is trapped into the kernel mode. Note operation 503.

In one optional embodiment, such trapping may prompt an examination of a state of the user mode. See operation 504. Specifically, it may be determined whether such state indicates an actual trap or a normal user mode call. See decision 505.

If it is determined that the state indicates a normal user mode call, the method 500 may proceed by simply passing control to the original handler. See operation 506. If, on the other hand, it is determined that the state indicates a trap, the method 500 proceeds by passing control to an internal handler in the kernel mode. See operation 507.

It should be noted that the aforementioned trap may be implemented in various ways. For example, an alternate kernel mode implementation may be installed for an NtYieldExecution service call. Such function stops execution of a calling thread, and switches to any other currently running thread. Such alternate handler may execute anytime user mode code calls such NtYieldExecution export function, and may examine the state of the user mode calling registers and/or stack to determine if it was a trap or just a normal user mode call of the NtYieldExecution function, in the manner set forth above.

It is again emphasized, however, that the trap may implemented using other techniques. For example, a breakpoint instruction, or added service call may be used. In such embodiments, operations 504, 505, and 506 may be omitted, since control may simply be passed to the internal handler after operation 503.

After the control is passed to the internal handler, the operations may be performed in the kernel mode after the control is passed to the internal handler. See operation 508. As mentioned earlier, the operations may include diagnostic operations, maintenance operations, security operations (e.g. for precluding malware/spyware from executing, etc.), and/or any other operations capable of being performed in the kernel mode.

In the context of the embodiment where the operations include security operations, the security operations may include any one or more of a variety of functions which enhance a security of the computer system. For example, such security operations may involve identifying an application that is running, and conditionally allowing user mode functions to be performed based on the identified application. Specifically, the kernel mode code may identify a name of an application that is currently executing, and only allow applications with certain names to execute some user mode operations. To accomplish this, a database such as that shown in Table 1 below may be used.

TABLE 1

| Application Identifier | Allowed User Mode Functions |
| --- | --- |
| Application_1 | User_Mode_Function_1 |
|  | User_Mode_Function_2 |
| Application_2 | User_Mode_Function_3 |
|  | User_Mode_Function_4 |
| Application_3 | User_Mode_Function_5 |
|  | User_Mode_Function_1 |

Of course, the above database is set forth for illustrative purposes only and should not be construed as limiting in any manner whatsoever.

As yet another example, the security operations may examine memory attributes associated with user mode code segments. In particular, the memory attributes of user mode code that has recently executed may be examined to determine if the computer is under the control of a buffer overflow type attack or the like.

As still yet another example, the security operations may include precluding code residing in writeable memory from making calls. Still yet, the security operations may include any sort of desired reporting, logging, auditing, etc. In other embodiments, a behavior of the intercepted user mode code may be modified in any desired manner to prevent data under control of a malicious user or program from causing a computer system to make unintended memory modifications that would allow code defined by an attacker to take control of the system.

Referring again to FIG. 5, after the operations are performed in the kernel mode, control is returned from the kernel mode to the user mode. See operation 509. Specifically, control may be returned to the related intercepted instructions. This may, for example, be accomplished using the instructions copied in operation 402 of FIG. 4. In operation 510, the code jumps to a point just following the intercept point. Again, this may be accomplished, for example, using the jump instruction set forth in operation 404 of FIG. 4.

The method 500 may thus optionally be used to allow a system extension to run in kernel mode in the form of a software device driver (or any other form, for that matter, etc.) that can intercept the execution of specific code in user mode and perform additional and/or replacement operations from kernel mode code. Such additional and/or replacement operations in kernel mode code may then, in turn, be used to prevent known and/or unknown computer attacks from succeeding.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing malware from executing, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:

identifying a first instruction in code prior to executing the code, the code to execute in a user mode from a first memory location, the code comprising the first instruction and subsequent second and plural additional instructions;

using a kernel mode driver to allocate a block of user mode memory at a second memory location different from the first memory location;

creating a redirect stub in the allocated block of user mode memory that begins with a series of computer instructions that implement a trap into a kernel mode;

copying the second and plural additional instructions from the first memory location to the allocated block of user mode memory, the second and plural additional instructions representing instructions to be intercepted;

placing an intercept by altering instructions in the first memory, after the first instruction, to transfer control to the redirect stub;

placing a jump instruction in the second memory after the copied instructions to return execution of the code to the first memory at a location following a last instruction of the copied instructions; and causing performing security operations using an internal handler in the kernel mode in response to the interception caused by execution of the code and after control is passed to the internal handler via the redirect stub, wherein, after the security operations are performed in the kernel mode, control is returned from the kernel mode to the user mode.

2. The method of claim 1, wherein the security operations include diagnostic operations.

3. The method of claim 1, wherein the security operations include maintenance operations.

4. The method of claim 1, wherein the security operations preclude malware from executing.

5. The method of claim 1, wherein the security operations include identifying an application that is running, and conditionally allowing user mode functions to be performed based on the identified application.

6. The method of claim 1, wherein the security operations include examining memory attributes associated with user mode code segments.

7. The method of claim 1, wherein the security operations include precluding code residing in writeable memory from making calls.

8. The method of claim 1, wherein the security operations that are performed in the kernel mode after control is passed to the internal handler include kernel mode code operations to identify a name of an application that is executing the code in the user mode, and only allow applications with certain names to execute particular user mode functions.

9. A computer program product embodied on a non-transitory computer readable medium comprising executable instructions stored thereon to cause one or more processors to:
   identify a first instruction from code to execute in a user mode from a first memory location, the code comprising the first instruction and subsequent second and plural additional instructions;
   use a kernel mode driver to allocate a block of user mode memory at a second memory location different from the first memory location;
   create a redirect stub in the allocated block of user mode memory that begins with a series of computer instructions that implement a trap into a kernel mode;
   copy the second and plural additional instructions from the first memory location to the allocated block of user mode memory, the second and plural additional instructions representing instructions to be intercepted;
   placing an intercept by altering instructions in the first memory, after the first instruction, to transfer control to the redirect stub;
   placing a jump instruction in the second memory after the copied instructions to return execution of the code to the first memory at a location following a last instruction of the copied instructions; and
   perform security operations using an internal handler in the kernel mode in response to the interception caused by execution of the code and;
   after control is passed to the internal handler via the redirect stub,
   wherein, after the security operations are performed in the kernel mode, control is returned from the kernel mode to the user mode.

10. The computer program product of claim 9, wherein the security operations include diagnostic operations.

11. The computer program product of claim 9, wherein the security operations include maintenance operations.

12. The computer program product of claim 9, wherein the security operations preclude malware from executing.

13. The computer program product of claim 9, wherein the security operations include identifying an application that is running, and conditionally allowing user mode functions to be performed based on the identified application.

14. The computer program product of claim 9, wherein the security operations include examining memory attributes associated with user mode code segments.

15. The computer program product of claim 9, wherein the security operations include precluding code residing in writeable memory from making calls.

16. A system, comprising:
   a processor; and
   a memory, wherein the memory stores instructions to configure the processor to:
      identify a first instruction from code to execute in a user mode from a first memory location, the code comprising the first instruction and subsequent second and plural additional instructions;
      use a kernel mode driver to allocate a block of user mode memory at a second memory location different from the first memory location;
      create a redirect stub in the allocated block of user mode memory that begins with a series of computer instructions that implement a trap into a kernel mode;
      copy the second and plural additional instructions from the first memory location to the allocated block of user mode memory, the second and plural additional instructions representing instructions to be intercepted;
      place an intercept by altering instructions in the first memory, after the first instruction, to transfer control to the redirect stub;
      place a jump instruction in the second memory after the copied instructions to return execution of the code to the first memory at a location following a last instruction of the copied instructions;
      and
      perform security operations using an internal handler in the kernel mode in response to the interception caused by execution of the code and;
      after control is passed to the internal handler via the redirect stub,
      wherein, after the security operations are performed in the kernel mode, control is returned from the kernel mode to the user mode.

17. The system of claim 16, wherein the security operations preclude malware from executing.

18. The system of claim 16, wherein the security operations include identifying an application that is running, and conditionally allowing user mode functions to be performed based on the identified application.

19. The system of claim 16, wherein the security operations include examining memory attributes associated with user mode code segments.

20. The system of claim 16, wherein the security operations include precluding code residing in writeable memory from making calls.

* * * * *

UNITED STATES PATENT AND TRADEMARK OFFICE
CERTIFICATE OF CORRECTION

| | | |
|---|---|---|
| PATENT NO. | : 8,572,729 B1 | Page 1 of 1 |
| APPLICATION NO. | : 11/344431 | |
| DATED | : October 29, 2013 | |
| INVENTOR(S) | : Joe C. Lowe et al. | |

It is certified that error appears in the above-identified patent and that said Letters Patent is hereby corrected as shown below:

In the Claims:

In column 6, line 54, in claim 1, before "performing" delete "causing".

Signed and Sealed this
Eleventh Day of February, 2014

Michelle K. Lee
*Deputy Director of the United States Patent and Trademark Office*